Oct. 14, 1947.                L. E. NEELEY                2,428,983
                           PISTON CONSTRUCTION
                           Filed June 23, 1945
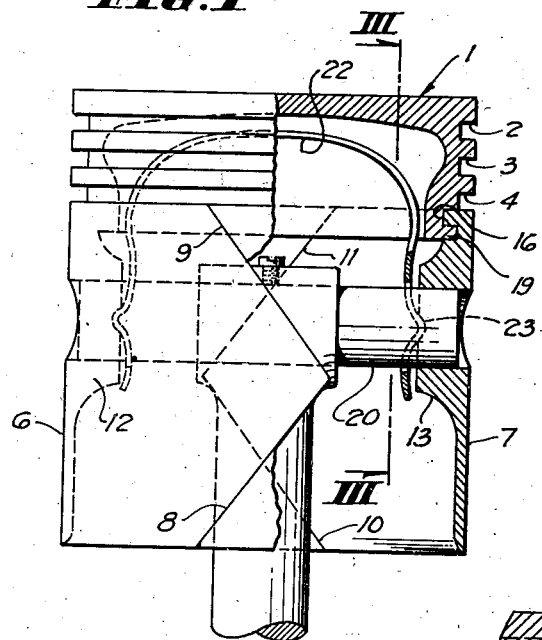
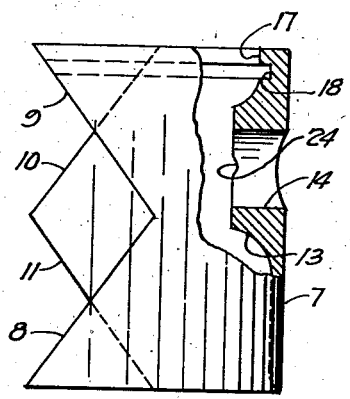
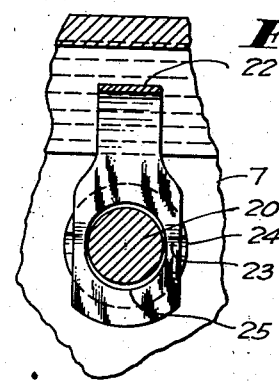
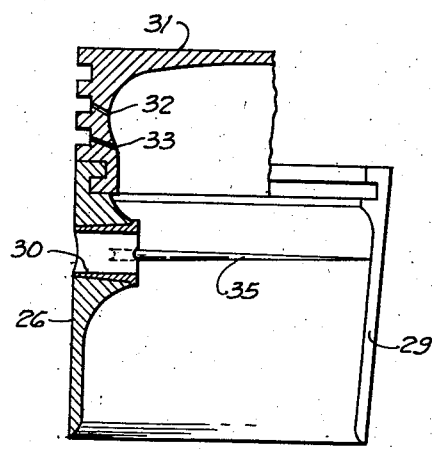
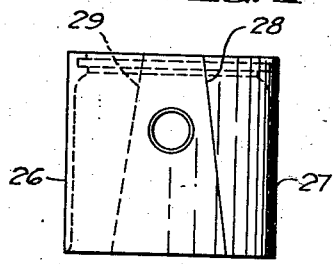
LESTER E. NEELEY
    INVENTOR.
BY
ATTORNEY Patented Oct. 14, 1947

2,428,983

UNITED STATES PATENT OFFICE 2,428,983

PISTON CONSTRUCTION

Lester E. Neeley, North Hollywood, Calif.

Application June 23, 1945, Serial No. 601,265

4 Claims. (Cl. 309—15)

This invention pertains to an improved piston construction whereby greater efficiency is imparted to the motor or engine in which the piston is used and economies of both fuel and lubricant are attained.

Reciprocating engines customarily employ pistons and the pistons generally comprise a head and a skirt, these two elements being integral. The piston is generally provided with expandible rings which are designed to prevent leakage of gas from the compression cylinder past the piston. During reciprocation and because of the rapidity with which the piston travels as well as the centrifugal force developed, pistons readily wear the cylinder walls and begin to rock, i. e., the axis of the piston departs from alignment with the axis of the cylinder. This rocking is most pronounced at the top of the stroke and is readily observed by an examination of the cylinder walls and of the rings carried by the piston. The cylinder walls depart from true roundness and become egg-shaped in transverse section. The rings carried by the piston lose their square, relatively sharp edges and also become rounded on their outer surfaces which are supposed to be in contact with the cylinder walls. These types of wear cause "blowby" or loss in compression and decrease the mileage or increase the consumption of fuel and oil. The entire life of the engine is reduced.

The present invention is directed to a piston assembly which comprises a separate piston head and a separate skirt, the skirt being parted longitudinally into two mating portions. The skirt portions are removably attached to the piston head. Positioned within this assembly are spring means tending to force the two skirt portions apart and into snug, sliding contact with the walls of the cylinder. This novel construction has been found to eliminate or inhibit rocking, unnecessary wear of cylinder walls or rings, to increase the life of the rings and of the motor, and to materially reduce the fuel and lubricant consumption.

An object of the present invention, therefore, is to disclose and provide a novel piston assembly which includes a piston head and a separable multisection skirt.

Another object of the invention is to provide a piston assembly in which the piston head carries suitable sealing rings whereas the skirt is separable from the head and removably attached thereto, the entire assembly including spring means urging the skirt sections into sliding contact with the cylinder walls.

These and other objects will become apparent to those skilled in the art from the following description of certain exemplary forms of the invention illustrated in the appended drawings, in which:

Fig. 1 is a side elevation, partly in section, of a piston assembly made in accordance with this invention.

Fig. 2 is a side view of one of the piston skirt portions used in the assembly of Fig. 1.

Fig. 3 is a transverse sectional view taken along the plane III—III of Fig. 1.

Fig. 4 is an end view of two mating skirt portions of a modified design.

Fig. 5 is a longitudinal section taken through the boss of a skirt of the type shown in Fig. 4 with a piston head in engagement therewith.

By referring to Fig. 1 it will be noted that the piston assembly as it would appear within the cylinder of an engine includes a piston head 1 provided with circumferential grooves 2, 3 and 4 adapted to receive suitable compression or sealing rings (not shown). The assembly also includes a separable skirt, the skirt being parted longitudinally into two mating skirt portions indicated at 6 and 7. The parting line in this embodiment is indicated by lines 8 and 9, these lines being inclined to the longitudinal axis of the skirt and forming a marginal edge to the skirt section 6.

On the opposite side the parting line is indicated at 10 and 11. It will be noted that each of the skirt portions includes a wrist pin boss, skirt portion 6 carrying the boss 12 whereas portion 7 carries the boss 13.

Ordinarily a complete unitary longitudinal skirt is first formed and the bosses are bored and ground so as to make certain that they are diametrically positioned and the wrist pin bores are in alignment. A wrist pin bore is indicated at 14. The lower edge portions of the skirt may be beveled or finished in any suitable manner so that if desired the skirt itself acts as a scraper ring.

Means are provided for removably attaching the skirt portions to the head 1. Such means may comprise a complete circumferential groove 16 formed in the lower portion of the head 1. The upper edge portion of the skirt may be provided with an inwardly extending lip 17 adapted to slidably enter the groove. Adjacent such lip the internal surface of the skirt may be provided with a groove 18 adapted to receive an outwardly extending lip 19 forming the lower edge of the piston head 1, such lip extending outwardly around the entire circumference of the head. Since the skirt is split longitudinally, the two skirt portions 6 and 7 may be readily attached to the head 1 and when so attached it will be found that the wrist pin bosses are diametrically opposed and the wrist pin bores are in alignment, thereby permitting the wrist pin 20 to be readily inserted and the connecting rod attached thereto in any suitable manner.

Positioned within the assembly are spring means tending to separate the skirt portions and to press the same against the walls of the cylinder. In Fig. 1 such means are shown to comprise a lift type spring 22 provided with apertured ends which encircle the wrist pin 20 and press against the inner ends of the bosses 12 and 13. Means may also be provided for inhibiting free movement of the spring within the assembly, so that it does not become displaced and run afoul of the connecting rod. Each end portion of the spring, for example, may be provided with an outwardly extending bead 23 adapted to seat itself within an indentation 24 formed in the boss. The indentations 24 are diametrically opposed and the beads 23 are on either side of the aperture 25 formed in the end of spring 22 so that the spring 22 is maintained in a substantially vertical position within the assembly and presses outwardly against the bosses, thereby tending to separate the two mating skirt portions 6 and 7.

In the modified form illustrated in Figs. 4 and 5, the two mating sections of the skirt are shown, at 26 and 27, and the parting lines are substantially straight but inclined to the longitudinal axis of the skirt. The parting lines 28 and 29 are shown adjacent the areas in which the bosses are formed and are inclined to the longitudinal axis from about 3° to about 15°.

When a broken parting line, such as is shown in Figs. 1 and 2, is used the portions 8 and 9 of such parting line may be inclined to the longitudinal axis from 5° to as much as 45°, although it is desirable not to employ parting lines which are inclined more than about 30° to the longitudinal axis.

In the modification shown in Figs. 4 and 5 the bores formed in the bosses are tapered and fitted with brass bushings 30 adapted to slidably receive the wrist pin. It will be noted that in this modified form a different arrangement of lips and grooves is employed in attaching the piston head 31 to the skirt portions in that the top of the skirt portion does not form a bottom for one of the ring grooves in the head but instead is in sliding fit with the piston head. Moreover, oil drain channels 32 and 33 are shown extending from the ring grooves of the piston head to the interior of the head.

Each of the skirt portions 26 and 27 is provided with a circumferentially extending, tapered, internal rib 35, such rib extending from the boss to near the edge formed by the inclined parting line which separates the skirt portion from its mate. The rib 35 may feather out both in width and height at such parting edge but may be of considerable height (inwardly) adjacent the boss.

It has been found that these ribs are desirable in that they tend to eliminate stress and distortion which may arise when a complete skirt is sawed along the inclined parting lines into skirt portions.

It may be noted that the bushing 30 is provided with diametrically opposed indentations along this inner face for the reception and anchoring of spring means which are to be positioned within the assembly.

Those skilled in the art will observe that the piston assembly is readily and economically manufactured and the resulting construction is lighter than the conventional one. The end portion of the piston is imperforate and screws, bolts or other elements are not employed in connecting the piston head to the skirt portions. The insertion of these piston assemblies into a cylinder is readily accomplished by the use of a forming ring in which the assembly is first made and from which it is then pressed into the cylinder itself.

In actual use it will be found that the skirt sections are pressed against the walls of the cylinder and the piston head is maintained in a proper transverse position without rocking or excessive play. Lubricating oil is not diluted by fuel nor is it fouled up by products or residues of combustion from the combustion chamber. The life of the rings is increased and the efficiency of the entire engine is enhanced.

Those skilled in the art will also appreciate that numerous changes and modifications could be made without departing from the invention here disclosed. Various means for releasably connecting the skirt portions to the head may be used. Various arrangements of spring means for yieldably urging the skirt portions apart may be employed. A variety of methods and devices may be utilized in anchoring the spring means within the assembly. All such changes are embraced by the appended claims.

I claim:

1. A piston assembly comprising: a piston head provided with ring grooves for the reception of sealing rings for cooperation with walls of a cylinder in which said head is to be slidably positioned; a separable piston skirt provided with opposing wrist pin bosses, each having a bore, said skirt being parted longitudinally along lines inclined from about 3° to 15° to the axis of the skirt to form two mating skirt portions, each portion carrying one of the bosses, the upper ends of said skirt portions including flange and groove elements alignable in complete circumferential arrangement for cooperatively engaging a circumferential lip and groove on the piston head to form a piston assembly wherein the piston head is above the wrist pin bosses; and leaf spring means within the assembly and bearing against the bosses tending to force the skirt portions apart into contact with a cylinder wall.

2. A piston assembly of the character stated in claim 1 characterized in that each end portion of the leaf spring is arranged to cooperate with a boss to inhibit free movement of the spring within the assembly in a direction transverse to the axis of bores in the bosses.

3. A piston assembly of the character stated in claim 1 characterized in that each end portion of the leaf spring is arranged to cooperate with a boss to inhibit free movement of the spring within the assembly in a direction transverse to the axis of bores in the bosses and cooperating means are formed in the inner ends of the bosses and spring means arranged to inhibit free movement of the spring means within the assembly.

4. A piston assembly of the character stated in claim 1 characterized in that the leaf spring means is provided with apertured ends adapted to encircle a wrist pin journaled in the bosses.

LESTER E. NEELEY.

REFERENCES CITED

The following references are of record in the file of this patent:

UNITED STATES PATENTS

| Number | Name | Date |
|---|---|---|
| 1,053,790 | Derby et al. | Feb. 18, 1913 |
| 1,368,167 | Laneville | Feb. 8, 1921 |
| 1,789,750 | Teetor | Jan. 20, 1931 |
| 1,795,353 | Taylor et al. | Mar. 10, 1931 |
| 1,999,644 | Strong et al. | Apr. 30, 1935 |
| 2,049,922 | Nienow | Aug. 4, 1936 |
| 2,242,345 | Cole | May 20, 1941 |
| 2,257,236 | Hayden | Sept. 30, 1941 |